US006458279B1

(12) United States Patent
Duffield et al.

(10) Patent No.: US 6,458,279 B1
(45) Date of Patent: Oct. 1, 2002

(54) FUEL FILTER AND PRODUCTION PROCESS

(75) Inventors: Roger Duffield, Hampshire (GB); Randall M. German, State College, PA (US); Teh Fu Yen, Los Angeles, CA (US); Ronald G. Iacocca, State College, PA (US)

(73) Assignee: Klinair Environmental Technologies (Ireland) Limited, Dublin (IE)

( * ) Notice: Subject to any disclaimer, the term of this patent is extended or adjusted under 35 U.S.C. 154(b) by 0 days.

(21) Appl. No.: 09/120,301

(22) Filed: Jul. 22, 1998

Related U.S. Application Data

(63) Continuation of application No. PCT/IE97/00003, filed on Jan. 22, 1997, which is a continuation of application No. 08/589,702, filed on Jan. 22, 1996, now abandoned.

(30) Foreign Application Priority Data

Jan. 22, 1996 (IE) ............................................... 960054

(51) Int. Cl.[7] ............................................... B01D 15/04

(52) U.S. Cl. .................. 210/687; 210/689; 210/500.25; 210/502.1; 210/503; 210/510.1; 29/896.62; 29/902; 75/340; 420/562

(58) Field of Search ......................... 210/510.1, 500.25, 210/673, 660, 681, 687, 689, 503, 502.1; 123/1 A, 434, 538; 44/321, 629; 419/2, 5; 420/559, 562, 570, 571, 576, 589, 557; 75/746, 751, 351, 356, 357, 340; 29/902, 896.62

(56) References Cited

U.S. PATENT DOCUMENTS

| | | | | | |
|---|---|---|---|---|---|
| 2,220,641 A | * | 11/1940 | Davis | | |
| 3,507,789 A | * | 4/1970 | Heilweil | | |
| 3,617,580 A | * | 11/1971 | Geyer | | |
| 3,682,608 A | | 8/1972 | Hicks | .......................... | 48/180 |

(List continued on next page.)

FOREIGN PATENT DOCUMENTS

| | | | |
|---|---|---|---|
| GB | 1079698 | | 8/1967 |
| WO | WO9014516 | | 11/1990 |
| WO | 90/14516 | * | 11/1990 |
| WO | 97/27395 | * | 7/1997 |
| ZA | 644782 | | 10/1964 |

OTHER PUBLICATIONS

Hawley's Condensed Chemical Dictionary, 13th Ed.; Lewis, Richard Sr., pp. 813 and 829, 1997.*

Database WPI Section Ch, Week 9443, Derwent Publications Ltd., JP06271957 (Nippon Glass Co Ltd), Sep. 27, 1994.

Metals Handbook, $10^{th}$ Edition, vol. 2, "Properties and Selection Nonferrous . . . ", pp. 913–942, Oct. 1990.

*Primary Examiner*—Matthew O. Savage
*Assistant Examiner*—Marianne Ocampo
(74) *Attorney, Agent, or Firm*—Jacobson Holman, PLLC

(57) ABSTRACT

A fuel filter having a formulation of a stable intermetallic compound of materials such as tin and antimony. The filter may have an integral porous structure or may be in the form of particles. It removes trace metal ions such as Ca and Na ions.

23 Claims, 13 Drawing Sheets

2 wt. % stearic acid 50x with Stearic Acid (2wt %)

U.S. PATENT DOCUMENTS

| | | | | | |
|---|---|---|---|---|---|
| 4,396,677 | A | * | 8/1983 | Intrater et al. | |
| 4,517,926 | A | * | 5/1985 | Reinhard et al. | |
| 4,540,437 | A | * | 9/1985 | Patel | |
| 4,590,914 | A | * | 5/1986 | Rosky et al. | |
| 4,715,325 | A | * | 12/1987 | Walker | |
| 4,723,993 | A | * | 2/1988 | Kopatz et al. | |
| 4,756,746 | A | * | 7/1988 | Kemp, Jr. et al. | |
| 5,092,303 | A | | 3/1992 | Brown | 123/538 |
| 5,161,728 | A | | 11/1992 | Li | 228/124 |
| 5,230,924 | A | | 7/1993 | Li | 427/229 |
| 5,248,079 | A | | 9/1993 | Li | 228/121 |
| 5,249,552 | A | * | 10/1993 | Brooks | |
| 5,392,982 | A | | 2/1995 | Li | 228/124 |
| 5,393,723 | A | * | 2/1995 | Finkl | |
| 5,404,913 | A | * | 4/1995 | Gilligan | |
| 5,433,777 | A | * | 7/1995 | Sheppard | |
| 5,451,444 | A | * | 9/1995 | De Liso et al. | |
| 5,524,594 | A | * | 6/1996 | D'Alessandro | |
| 5,580,359 | A | * | 12/1996 | Wright | |
| 5,674,802 | A | * | 10/1997 | Sheppard | |
| 5,738,692 | A | * | 4/1998 | Wright | |
| 5,750,026 | A | * | 5/1998 | Gadkaree et al. | 210/502.1 |
| 6,024,073 | A | * | 2/2000 | Butt | |

* cited by examiner

100% Hydrogen

100% Nitrogen

X-ray diffraction patterns of powder sintered in 100% $N_2$ and $H_2$ atm. compared with the standard SbSn as calibrated 0 wt. % stearic acid 50x No Stearic Acid 2 wt. % stearic acid 50x with Stearic Acid (2wt %)

X-ray diffraction pattern of powder stacked along with those of standard SbSn, SnO, $SnO_2$ Diffraction angle (2θ) in degrees X-ray diffraction pattern of outside of cast pellet showing the presence of intermetallic SbSn Diffraction angle (2θ) in degrees X-ray diffraction pattern of inside of cast pellet

FUEL FILTER AND PRODUCTION PROCESS

This application claims the benefit of the filing date of PCT/IE97/00003, filed Jan. 22, 1997, which is a continuation of U.S. patent application Ser. No. 08/589,702, filed Jan. 22, 1996, now abandoned.

The present invention relates to a fuel filter and to a process for producing such a filter. In this specification, the term "fuel" means any liquid hydrocarbon from crude oil to fully refined, and "filter" means a solid for contact with fuel before combustion to act on or clean the fuel to reduce noxious emissions from subsequent combustion.

It is well known to use a post-combustion catalytic converter to reduce noxious emissions from internal combustion engines. Typically, such converters have a honeycomb substrate of cordierite, which is a high-temperature ceramic. This substrate is plated with a catalyst of platinum material over a porous layer of aluminum oxide. Because of the expensive materials required and the complex structure, such converters are very expensive to produce. This is a major factor in limiting the spread of their use with consequent major adverse implications for the environment.

Some pre-combustion catalytic converters have been described in the art. However, they do not appear to have been implemented to a significant extent in practice, apparently because they are either not effective or are difficult and expensive to manufacture and maintain.

U.S. Pat. No. 3,682,608 (Hicks) includes a very general description of catalysis of fuel before combustion for improved effectiveness. The disclosure concentrates on the mesh structure for additional fuel-catalyzer contact and gives little detail of the catalysis.

GB 1079698 (Carbon Flo.) and WO 90/14516 (Wribro) describe use of a combination of tin, antimony, lead and mercury to provide an alloy which it is claimed catalyses components of fuel for improved efficiency and/or reducing toxicity of the exhaust gases. However, these arrangements do not appear to be particularly effective. ZA 644782 (Broquet) describes use of this type of alloy in the form of pellets immersed in the fuel tank.

A pre-combustion catalytic converter having a platinum catalyst is described in U.S. Pat. No. 5,092,303 (Brown). The catalyst is heated by an electric heater and causes cracking of liquid hydrocarbons in contact with it. It is not clear how effective the converter is, however, it appears to be expensive to produce because of the materials used and the need for a heater and associated control devices.

Thus, while it has been apparent for some time that use of a cleaner fuel would be a simpler way of obtaining improved emissions than use of a post-combustion catalytic converter, heretofore filters to clean fuel have not been used in practice because of lack of effectiveness for various reasons. There is therefore an urgent need for an effective fuel filter for pre-combustion action to cause cleaner emissions. The invention is directed towards providing such a filter.

According to the invention, there is provided a fuel filter for an internal combustion engine, the filter comprising an intermetallic compound.

Preferably, the compound comprises noble metals. The filter can thus attract fuel trace metal ions in an electrochemical displacement reaction.

In this specification, the term "intermetallic compound" means a compound of alloys that is formed when atoms of two metals combine in certain proportions to form crystals with a different structure from that of either of the metals. Further, the term "noble metals" means metals such as gold, silver, platinum, tin and antimony which have a relatively positive electrode potential, and which are more noble than the trace metals being removed such as calcium, sodium, or iron. By reducing such trace metals in the fuel, the combustion process is more efficient, resulting in cleaner emissions.

In one embodiment, the filter comprises an intermetallic of tin and antimony. Preferably, the tin atomic composition is in the range of 39.5% to 57%. In one embodiment, the tin and antimony are substantially equiatomic.

It has been found that such compositions are particularly effective at providing the galvanic potential for attraction of the trace metals.

In one embodiment, the filter comprises intermetallic particles. The particles may have an average diameter in the range of $1\times10^{-6}$ m to $1\times10^{-4}$ m. This is a particularly effective way of providing the filter. Small particles have a high surface area per unit volume and thus there is very effective attraction of the trace metals. The particles may be contained in a fluidised bed or in a column, or indeed may be added to fuel and later removed.

In another embodiment, the filter comprises a porous structure. This is a convenient and effective implementation, for example, for use in a refining process.

Preferably, the filter has a porosity in the range of 30% to 50%, and preferably has permeability of $1\times10^{-13}m^2$ to $400\times10^{-13}m^2$. The filter ideally has pores with sizes in the range of 2 $\mu$m to 300 $\mu$m.

In another aspect, the invention provides a process for producing a fuel filter, the process comprising the steps of preparing a formulation of an intermetallic compound. Preferably, the formulation comprises tin and antimony, and preferably the formulation has a tin atomic composition in the range of 39.5% to 57%.

In one embodiment, the step of preparing the compound comprises the sub-steps of preparing a melt, forming the melt into droplets, and rapidly solidifying the droplets to form intermetallic particles. Ideally, an inert atmosphere is provided around the melt to prevent oxidation. Ideally, the droplets are formed by gas atomisation whereby an inert gas breaks up a melt stream into the droplets.

In one embodiment, nitrogen is used for gas atomisation.

In another embodiment, the melt temperature is below a level at which the melt becomes significantly reactive and absorbs and/or reacts with oxygen.

In one embodiment, the particles are bonded by sintering to form a porous filter structure.

Preferably, the melt comprises tin and antimony and the sintering takes place at a temperature in the range 300° C. to 425° C. for a time duration of 20 to 40 minutes, and preferably the sintering temperature is approximately 370° C. and the time duration is approximately 30 minutes.

In one embodiment, a pore forming agent is added prior to sintering. The pore forming agent is preferably stearic acid.

The filter produced by the process may be in the form of an integral porous structure, it may be formed by deposition of the formulation onto a porous substrate, or it may comprise particles having said formulation and a size in the range of $1\times10^{-6}$ m to $1\times10^{-4}$ m.

According to another aspect, the invention provides a method of filtering or cleaning fuel comprising the steps of bringing the fuel into contact with an intermetallic compound.

In one embodiment, the filter comprises noble metals, preferably, a tin and antimony stable intermetallic compound.

DETAILED DESCRIPTION OF THE INVENTION

The invention will be more clearly understood from the following description thereof given by way of example only with reference to the following drawings in which.

Figure 6:
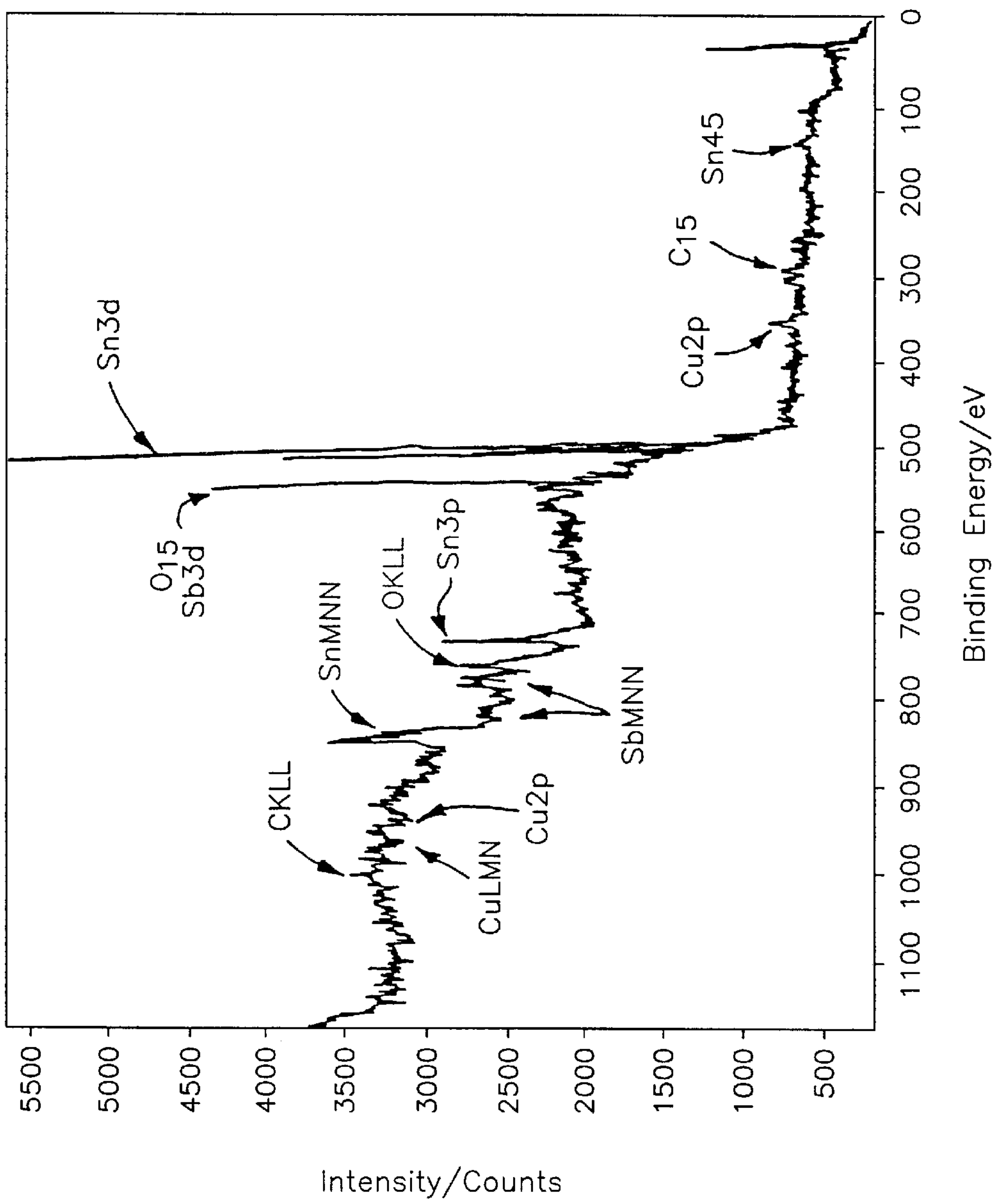
Figure 7:
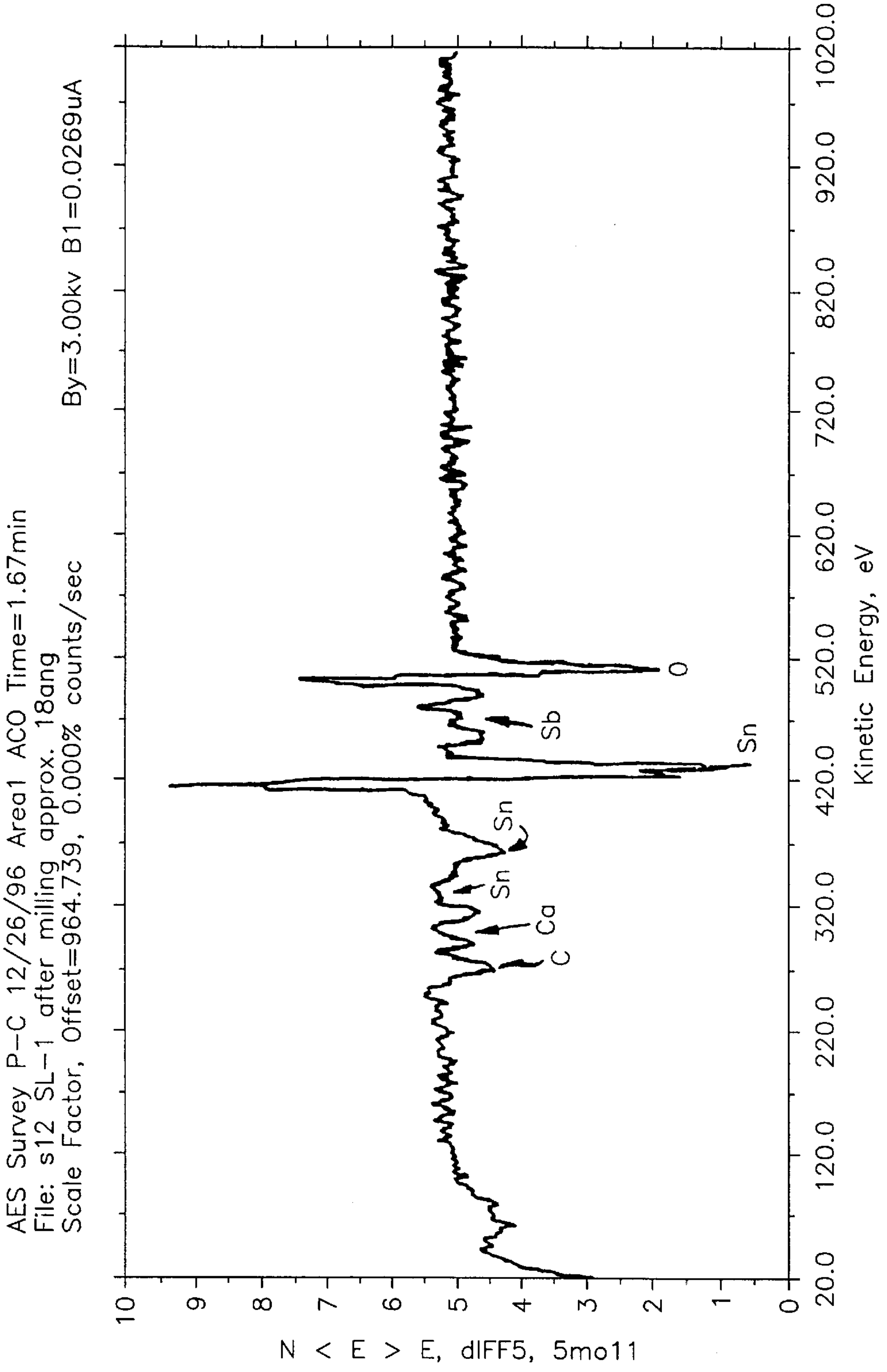
Figure 8:
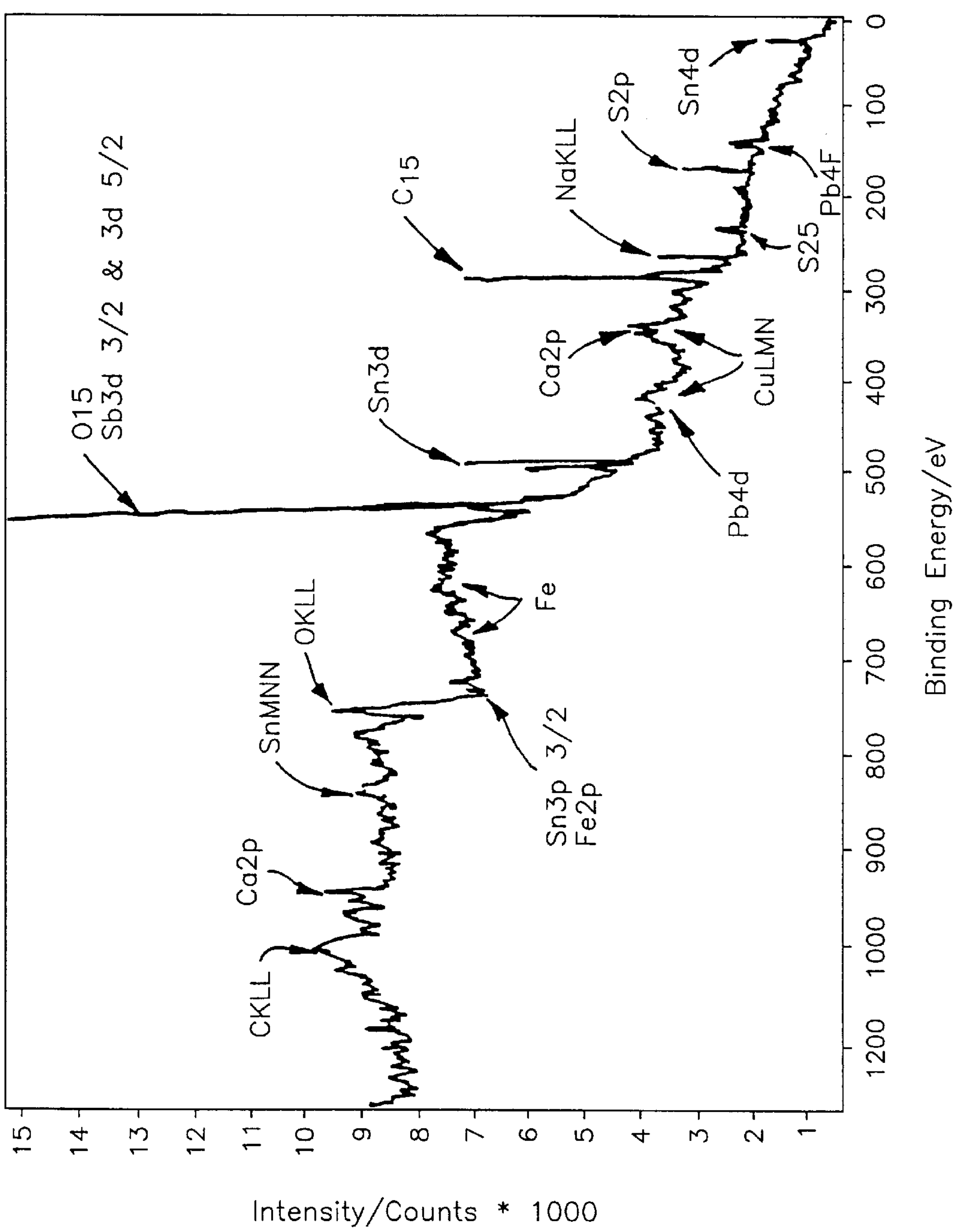
Figure 9:
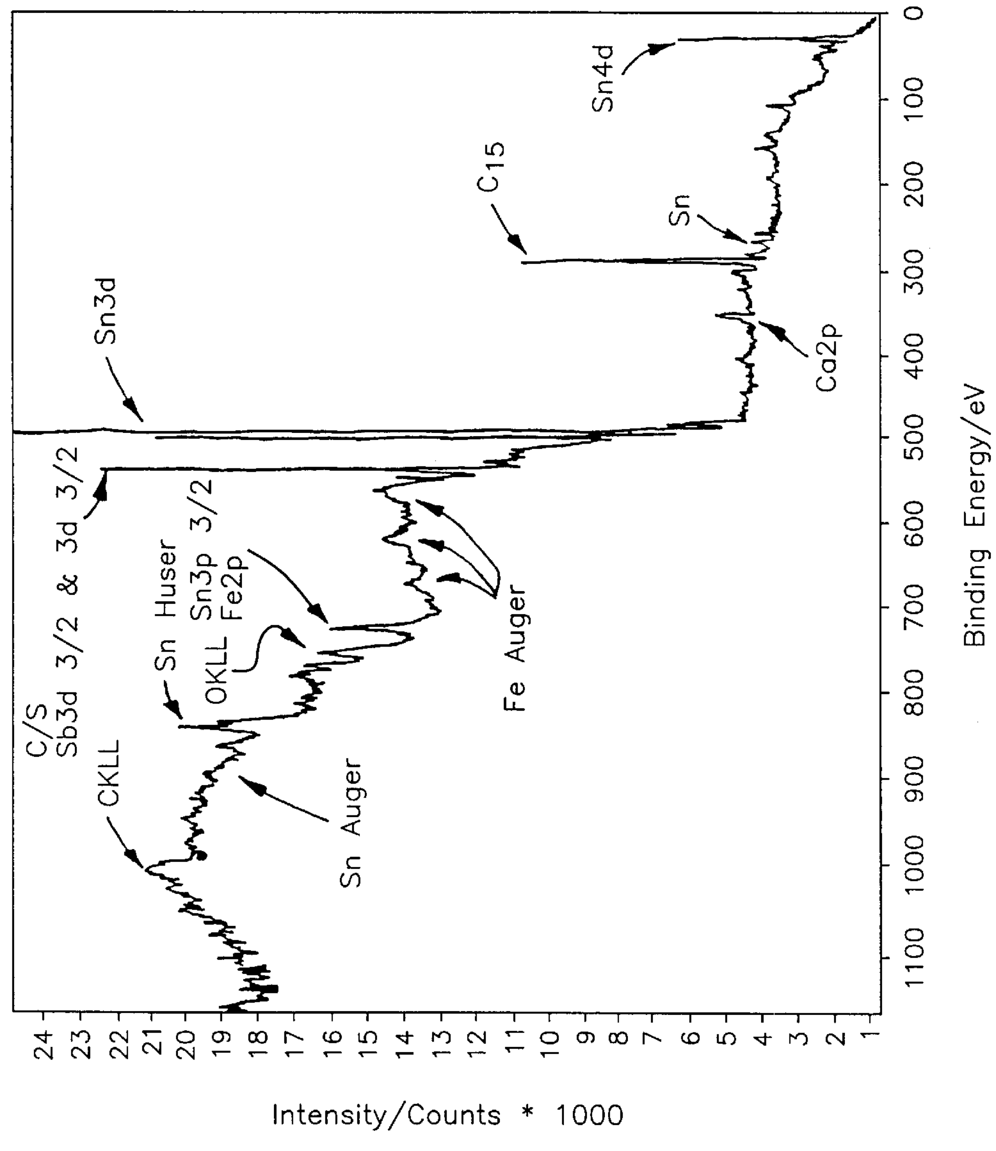

FIG. 6 graphically illustrates a study by X-ray photoelectron spectroscopy of a comparison of intensity/counts versus binding energy;

FIG. 7 graphically illustrates an Auger electron microscopy scan after the surface has been removed to an 18 Å depth on an intermetallic sample after 40 hours of refluxing with gasoline; and FIGS. 8 through 11 graphically illustrate studies by X-ray photoelectron spectroscopy of a comparison of intensity/counts versus binding energy.

The invention provides a fuel filter and a method for producing it. The filter acts on fuel which comes into contact with it to clean it and ultimately cause cleaner combustion emissions. The filter comprises an SbSn stable intermetallic compound, more particularly in which the tin atomic composition is in the range of 39.5% to 57% by weight.

The filter has a reaction with the fuel which involves scrubbing of trace ions from the fuel. Various ions are removed from the fuel before combustion. This reduces toxicity of the emissions. These ions contaminate reaction processes and their removal thus provides both cleaner fuel and cleaner emissions. They are removed by a reaction which includes deposition on the SbSn intermetallic or their oxides. We believe that the intermetallic electronic structure and also electrochemical displacement cause the deposition.

The ions which are removed include calcium, sodium, iron, copper, chlorine, aluminum, lead.

The following sets out how the filter is produced. Words which are used in headings of subsequent parts of the description are underlined.

In one example process of the invention, there is melt preparation in which an equiatomic composition of tin and antimony is melted in a graphite crucible using an induction heater. True atomic intermixing occurs in the molten state. The melt is held for 10 minutes at 500° C. with a hydrogen gas cover to avoid oxidation.

The melt is bottom poured into an atomisation nozzle operated with high pressure nitrogen at a plenum pressure of 2.5 MPa for gas atomisation. Nitrogen escapes through an annular gap surrounding the melt stream, causing formation of droplets. The adiabatic expansion of the gas rapidly cools the droplets and accelerates them away from the melt source. During the subsequent flight, the droplets freeze into SbSn intermetallic crystalline particles with an average size of 10 $\mu$m. The particles are collected in water and dried to form a powder.

These particles may be directly used because the microscopic size of the particles provides a high surface area for contact with the fuel. For example, the particles may be loose packed in a column. Alternatively, the powder may be used as follows to produce a porous structure through which fuel passes for surface contact.

The powder is subsequently loose packed into a machined graphite mould to form a disc with the addition of approximately 2% by weight stearic acid as a pore former. The graphite is heated in a hydrogen sintering atmosphere to bond the particles at 370° C. for 30 minutes.

By sintering in this manner, a porous filter having an optimal balance between bonding and porosity is formed.

The filter thus produced has the following properties:

| | |
|---|---|
| porosity: | 40–50% |
| permeability: | $10^{-11}$ $m^2$ |
| pore size: | 25 $\mu$m |

The following description sets out alternative ways or implementing steps of the process.

Melt Preparation

The materials used could in addition include other metals which are more noble than the ions being removed, such as platinum, gold or palladium. The formulation need not be equiatomic. The end-product intermetallic must, however, be stable and preferably has a tin atomic percentage in the range of 39.5 to 57%.

The melt may be at any temperature at which it does not absorb and/or react with oxygen.

It is envisaged that the materials need not necessarily be melted. For example, separate powders could be mechanically alloyed with sufficient energy such that the metals physically combine into a single powder.

Further, it is envisaged that a substrate having a porous structure may be used onto which the composition is coated, instead of providing an integral porous structure. In this case, a ceramic or metallic substrate may be used, and the composition may be coated by chemical or physical vapour deposition techniques, or by plasma spray coating.

Gas Atomisation

The gas atomisation pressure is dependent on the desired particle size, while being sufficient to provide the necessary high cooling rate. It is estimated that this is at least $10^3$°C./s.

For example, a lower pressure of 0.7 MPa may be used, providing a larger particle size of 20 $\mu$m.

The atomisation gas may alternatively be hydrogen, argon, helium or any other inert gas or any mixture of such gases.

Sintering Atmosphere

It is not essential that a hydrogen atmosphere be used.

Due to the problems associated with using a lower temperature hydrogen furnace, sintering behaviour has been studied in nitrogen and nitrogen-hydrogen atmospheres. It was found that sintering of filters in either complete nitrogen or a combination of hydrogen and nitrogen atmospheres resulted in a black coating on the surface. This was due to the deposition of carbon on the surface of the filter. Stearic acid is a hydrocarbon consisting of several C-H bonds and was used as a pore-forming additive. Burn out of stearic acid is facilitated by the breaking of carbon-hydrogen bonds and the formation of simple gases using a reducing atmosphere. Hydrogen is a reducing atmosphere and helps in the burnout of stearic acid as well as in the sintering of the powders. The use of a nitrogen atmosphere does not cause these two processes because of its non-reducing behaviour. The carbon deposition on the surface also hampered the sinterability of the powders. The samples sintered using the hydrogen/nitrogen combination were black on the surface and were very fragile. The carbon coating was found only on the surface and not on the other sides of the filter.

An interesting phenomenon noticed was that when the powder samples were covered by a graphite plate over the mould during sintering, the carbon deposition was prevented. Also, the powders covered by the graphite plate and sintered in a nitrogen atmosphere showed the same sintering behaviour as the powders sintered in hydrogen atmospheres. The covering plate (which was made of graphite) would have caused the formation of carbon monoxide which is a reducing atmosphere. It is envisaged that a plate other than graphite could be used, provided some part of the mould is carbon when using a nitrogen atmosphere.

Figure 1A:
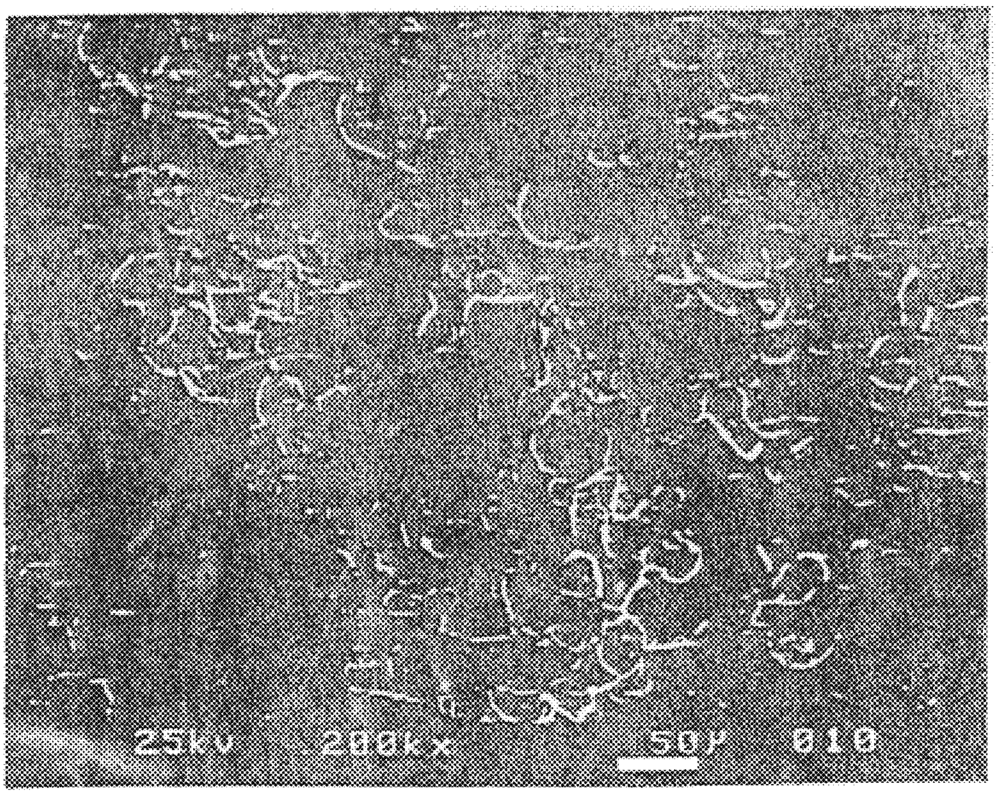
FIGS. 1A and 1B show scanning electron micrographs of filter samples sintered in 100% nitrogen and 100% hydrogen atmospheres, respectively.
Figure 1B:
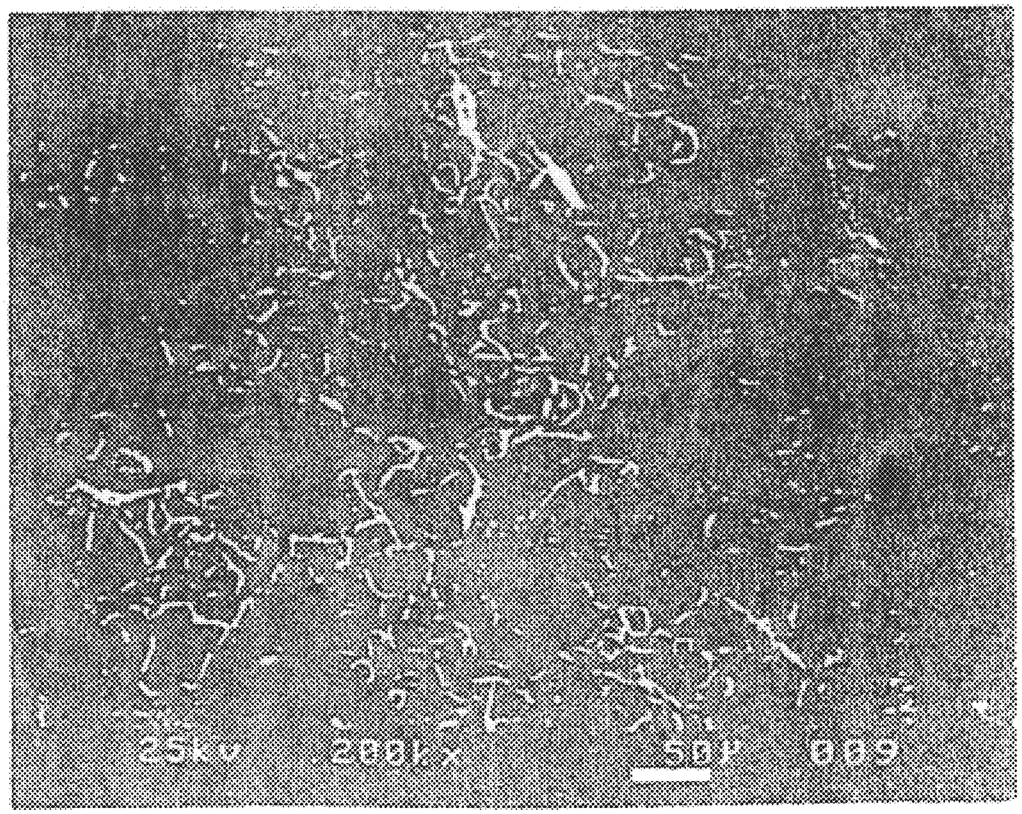

FIG. 1 shows fractographs of samples sintered in full hydrogen and full nitrogen atmospheres. They have a similar pore structure. The permeability, density and shrinkage of the filters sintered in 100% nitrogen and 100% hydrogen atmosphere are shown in Table 1.

TABLE 1

| Atmosphere | Permeability ($m^2$) | Density (%) | % Shrinkage in ht. | % Shrinkage in dia. | % Mass Loss |
|---|---|---|---|---|---|
| 100% $H_2$ | $1 \times 10^{-11}$ | 58 | 20 | 11 | 3.3 |
| 100% $N_2$ | $7 \times 10^{-12}$ | 61 | 17 | 9.5 | 3.1 |

Figure 2:
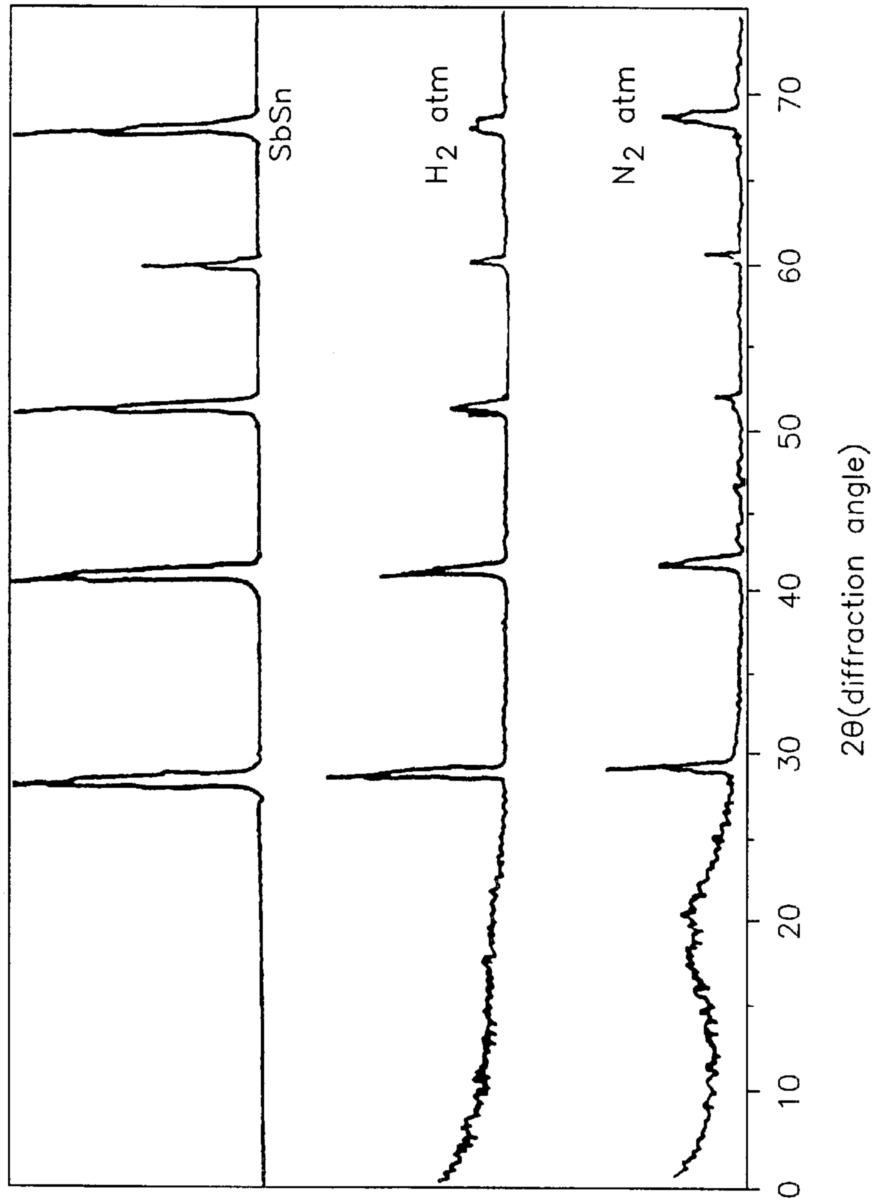
FIG. 2 is an X-ray diffraction pattern of sintered powder.

The X-ray diffraction patterns of the samples also show that the filters sintered using the nitrogen and hydrogen atmosphere form the same intermetallic phase SbSn (refer to FIG. 2).

In conclusion, powders mixed with 2 wt. % stearic acid showed the maximum permeability and pore size. The powders can be sintered in both 100% hydrogen as well as 100% nitrogen atmospheres, but for sintering in 100% nitrogen, the samples have to be covered at the top by a graphite boat to provide a reducing atmosphere. The samples sintered in 100% nitrogen atmosphere also formed the same intermetallic SbSn phase.

Sintering may be carried out by heating graphite to 370° C. in a graphite boat arrangement. In this case, oxygen reacts with the graphite to form CO gas, further oxidation reactions leading to formation of $CO_2$. Both reactions remove oxygen or oxides from the sintering environment. There is a continual consumption of graphite as it is transformed into a vapour over time.

Any suitable reducing atmosphere could be used. Examples are use of methane, CO, $H_2$, $N_2$—$H_2$ mixes, $NH_3$, and dissociated ammonia. Suitable combinations of the above gases could be used by endothermic or exothermic burning processes. In particular, the use of $H_2$—$N_2$ is attractive because at low $H_2$ levels of a few percent, the atmosphere is non-explosive, yet still reducing.

Additional Step—Sintering Additives

The process may have the additional step of adding an additive to the intermetallic powder to dilate the pores during sintering to provide a larger catalyst surface area. This is briefly referred to above and is described in more detail in this section.

In a specific example, stearic acid was chosen as a binder to be added to the powder to increase the permeability. The stearic acid used was Industrene 5016 manufactured by Witco. The reason for choosing stearic acid was that it completely burns out before reaching the sintering temperature of 370° C. Stearic acid and the powder were mixed in a grinder to form a uniform blend of the powder and the binder. The total time of grinding was approximately 2 minutes. The grinding was done in short time intervals of 20 seconds so as to prevent melting of stearic acid caused by heat generated in the grinder.

The sintering experiments were carried out in a retort in both nitrogen and hydrogen atmospheres, The permeability experiments were conducted using permeability measuring equipment using air as the flow medium and mercury as the reference liquid in a column. The Archimedes method was used to measure the final density.

Table 2 below compares the % density and permeability of filters sintered by mixing powders with different weight percentages of stearic acid at 370° C. in $H_2$ atmosphere.

TABLE 2

| Wt. % binder | Permeability ($m^2$) | Pore diameter ($\mu$m) | Density (%) |
|---|---|---|---|
| 0 | $5 \times 10^{-13}$ | 20 | 61 |
| 0.5 | $9 \times 10^{-12}$ | 37 | 65 |
| 1 | $9 \times 10^{-12}$ | 35 | 65 |
| 1.5 | $7 \times 10^{-12}$ | 50 | 62 |
| 2 | $2 \times 10^{-11}$ | 53 | 58 |

In Table 2, all of the measurements were made for powders sintered in a cavity made of graphite boat, 19 mm in diameter and 4.3 mm in height and were not of the size of the actual filter.

Figure 3A:
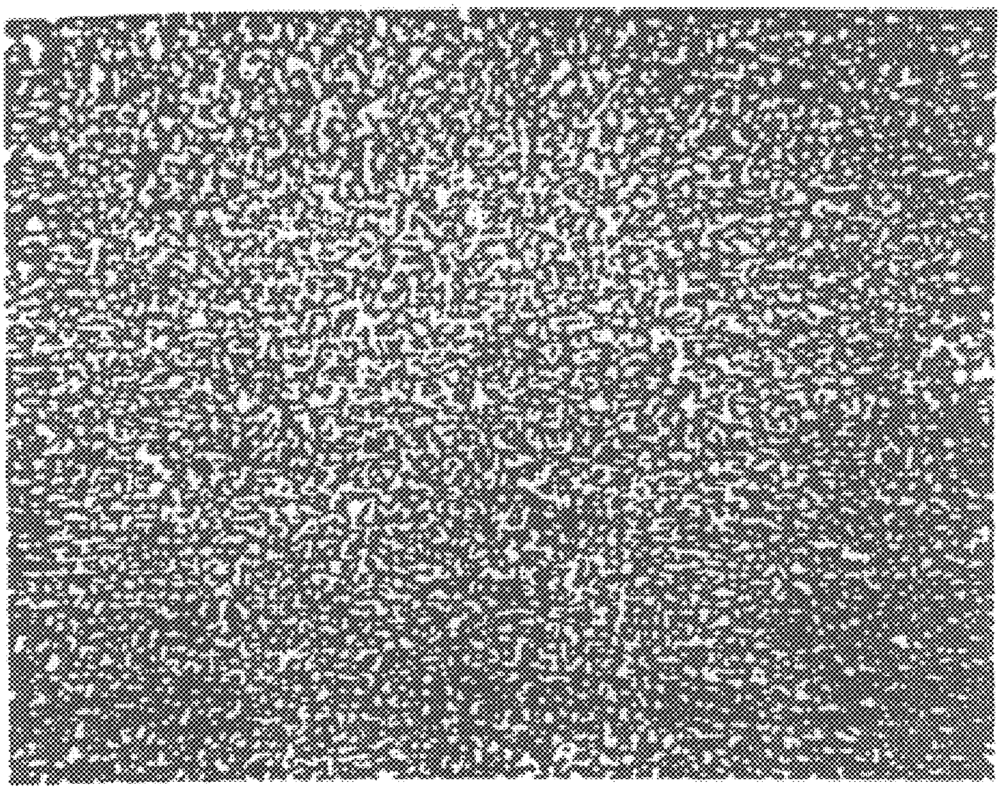
FIGS. 3A and 3B show optical micrographs of the surface of filters sintered using powders mixed with 0 wt. % and 2 wt % stearic acid, respectively.
Figure 3B:
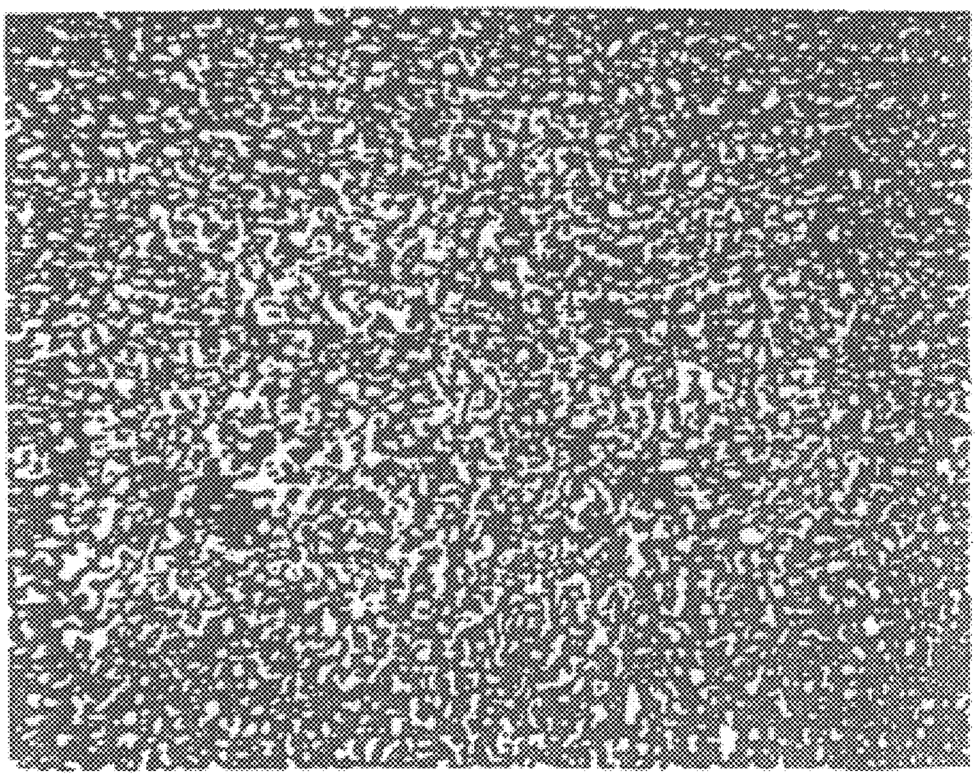

The powder mixed with 2 wt. % stearic acid gave a maximum permeability of $2\times10^{-11}$ $m^2$ and was approximately 50 times more permeable than the powder sintered without any binder. The powders mixed with 0.5 and 1 wt. % binder showed an increase in density while the powders mixed with 1.5 and 2 wt. % showed a decrease in density. Powders mixed with stearic acid showed better sintering behaviour than the powders that were not mixed with binders. The initial increase in density could be attributed to this behaviour. The decrease in density for powders mixed with more than 1 wt. % was due to the excessive pores created by the burnout of stearic acid. The powder mixed with 2 wt. % stearic acid and sintered had a maximum pore size of 52 $\mu$m and the highest porosity. FIG. 3 shows optical micrographs of the surface of filters sintered from powders with 0 and 2 wt. % stearic acid.

In general, any suitable agent which occupies space during heating but burns out during sintering may be used. Clean burnout at relatively low temperatures is desired. Stearic acid in powder form has been found to be suitable at a particle size of 100 $\mu$m or less. The powder may be added upon vibration of the intermetallic powder to allow a lower packing density, giving a dilated structure with a higher permeability after sintering.

Any suitable pore forming agent which has these general properties could be used, for example, ammonium carbonate, camphor, naphtha, ice, monostearates, and also low molecular weight waxes and organic gels. It is also envisaged that a pore forming agent which acts to provide a reducing atmosphere could be used, for example paraffin wax, which forms methane on burnout.

The process need not necessarily involve sintering. For example, the filter may be produced by melt spinning ribbon or wire and compressing it into filter form, in which case sintering may not be necessary.

It is also envisaged that the filter could be formed from one or a number of layers so that the desired properties are obtained using the layers as “standard parts”.

The invention is not limited to the embodiments described. The filter could have physical properties which are different from those outlined above. The following are desirable parameter value ranges:

| | |
|---|---|
| porosity: | 30 to 50% |
| permeability: | 1 to 400 × $10^{-13}$ $m^2$ |
| pore size: | 2 to 300 μm |

Where the metals are tin and antimony only, the relative compositions may be varied within the range described above. To contribute to electrochemical displacement, additional noble metals such as platinum, gold or palladium may be used—the important point that they are “more noble” than trace metals being removed, such as sodium and calcium. Metals such as gold and platinum are expensive and are unlikely to be commercially viable, however, they could be included in small quantities, such as 1–5% by weight gold.

Regarding the electrochemical displacement reaction, this is driven by the noble metals, tin and antimony and their stable intermetallic arrangement. In a fuel, it appears that small concentrations of calcium and sodium and other trace metals are naturally present. These ions adversely affect combustion because of altered reaction sequences.

These ions become attached to and coat the filter by virtue of the intermetallic electronic structure, and also electrochemical displacement reaction where the metals are noble. This reaction results in electrodeposition of ions onto the active surface of the intermetallic porous structure. In effect, the structure acts as a host for a galvanic reaction. The potential is created by the reaction of Sb and Sn.

In more detail, it is believed that the intermetallic possesses a variable electrode potential from E°+0.290 V to +2.648 V. This potential originates from the coupling of Sn and Sb species in an environment of fuel which has trace moisture with a variable amount of $H^+$ concentration. The following set of reactions and potentials relating to aqueous solutions demonstrate how we believe the potential arises. All the positive values signify that reactions proceed since the free energy is negative:

$$dG° = -nFE°,$$

in which d is delta, G is Gibb’s Free Energy, and F is Faraday’s constant.

TABLE 3

| No. | Reaction | E°, V |
|---|---|---|
| 1. | $Sb_2O_3 + 6H^+ + 3Sn = 2Sb + 3Sn^{2+} + 3H_2O$ | 0.290 |
| 2. | $2SbO^+ + 4H^1 + 3Sn = Sb + 3Sn^{2-} + 2H_2O$ | 0.350 |
| 3. | $2Sb + 3Sn + 6H^- = 2SbH_3 + 3Sn^{2+}$ | 0.373 |
| 4. | $SbO_3^- + Sn + H_2O = SbO_2^- + Sn^{2+} + 2OH$ | 0.453 |
| 5. | $2SbO_2^- + 4H_2O + 3Sn = 2Sb + 80H' + 3Sn_2^+$ | 0.523 |

TABLE 3-continued

| No. | Reaction | E°, V |
|---|---|---|
| 6. | $Sb_2O_5 + 6H^+ + 2Sn = 2SbO^+ + 3H_2O + 2Sn^{2+}$ | 0.719 |
| 7. | $Sb_2O_5 + 4H^+ + 2Sn = Sb_2O_3 + 2Sn^{2+} + 2H_2O$ | 0.809 |
| 8. | $Sb_2O_5 + 2HSnO_2^- + 4H_2O + 2OH' = Sb_2O_3 + 2Sn(OH)_6^{2-}$ | 1.601 |
| 9. | $3Sb_2O_5 + 4Sn + 6H_2O = 3Sb_2O_3 + 2Sn^{2+} + 2Sn(OH)_6^{2-}$ | 2.648 |

For example, there is conversion of $Na^+$ to Na and $Ca^{2+}$ to Ca. It appears that this causes the counter-ion such as $Cl^-$ to be oxidised to .Cl, or $HPO_4^Z$ to $.O(PO_4)_3$. The latter are good flame retardants and reduce combustion temperature. While the above equations refer to simple ions, the ions are in fact bonded to complex organic molecules.

The following sets out analyses of the filter. The filter surfaces were examined for trace metals. Each sample was analyzed in a central region which was believed to have had the most direct contact with the fuel. The experimental conditions were:

System Pressure: low $10^{-8}$ torr during analysis

X-Rays: unmonochromated Mg Kα

Anode Current, Voltage: 20 mA, 14 keV

Analyzer Mode: FAT

Magnification: 700 micron iris open

Pass Energy: 40 eV

Sample Tilt: approx. 20 degrees

Step Size: 1 eV

Dwell Time: 600 ms sample 1; 1000 ms samples 2 and 3

Smoothing: none

Background Subtraction: none

Relative Sensitivity Factors: not used

Figure 4:
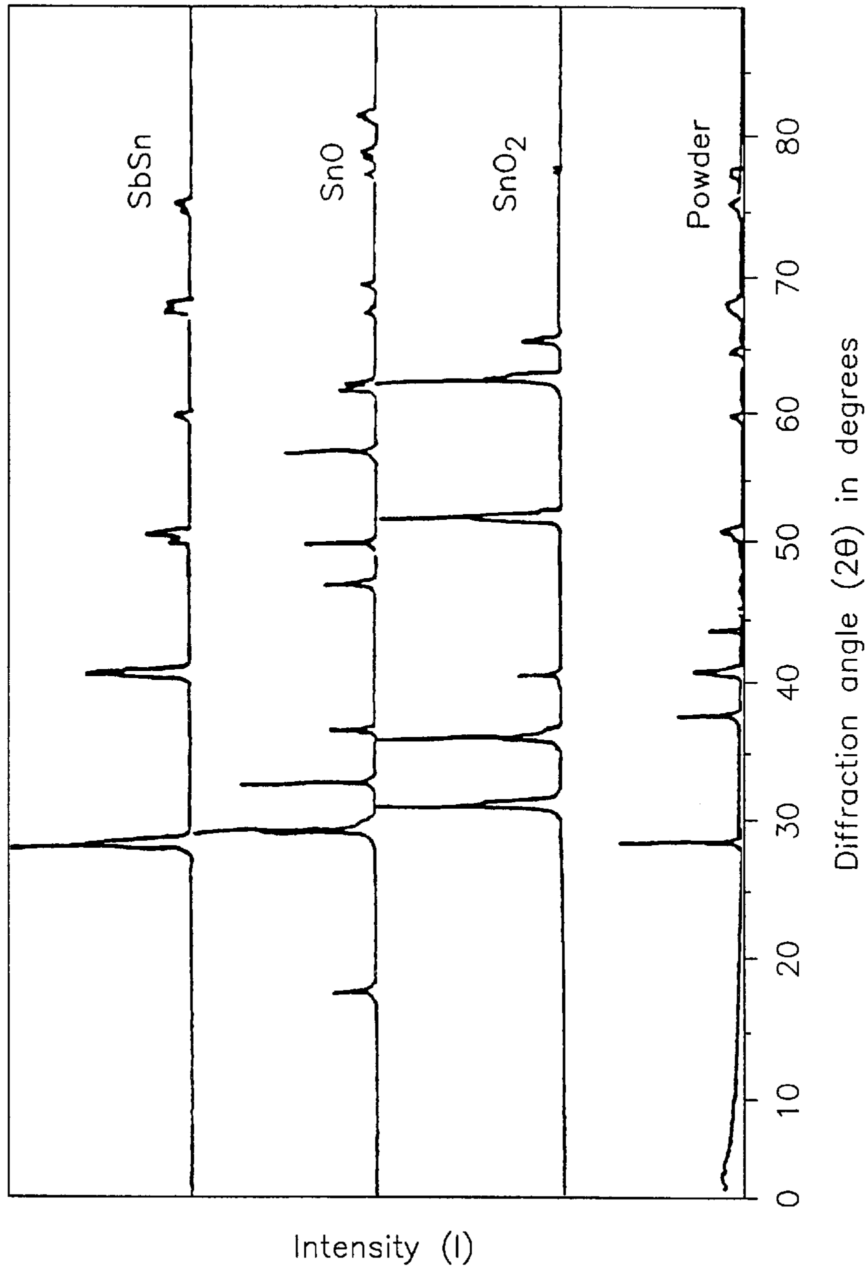
FIG. 4 illustrates an X-ray diffraction pattern of powder stacked along with those of standard SbSn, SnO and $SnO_2$.
Figure 5A:
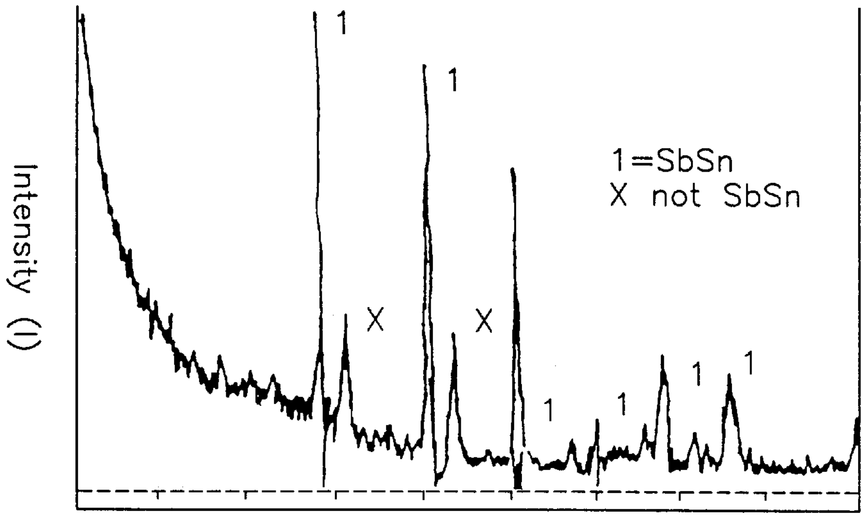
FIG. 5A illustrates an X-ray diffraction pattern of a cast pellet showing the presence of intermetallic SbSn.
Figure 5B:
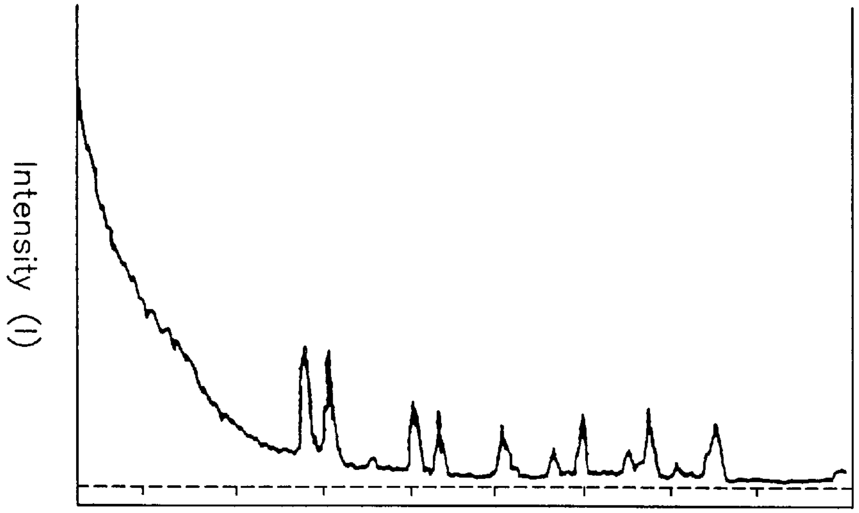
FIG. 5B illustrates an X-ray diffraction pattern of an inside of a cast pellet.

The intermetallics were studied by X-ray diffraction and the results showed that intermetallics contained extra bands (marked by X) other than SnSb at 2θ=31.5 and 2θ=36.5. These bands suggested the presence of SnO and $SnO_2$ (FIG. 4 and FIG. 5).

In another experiment, the intermetallics were subjected to a study by X-ray photoelectron spectroscopy (XPS). The results indicated the presence of O always, no matter if the surface was cleaned by $O_3$-UV or not (FIG. 6).

In another experiment, the intermetallics were subjected to scanning Auger Electron Microscopy (AEM). Oxygen was found on all intermetallics samples whether the intermetallics were exposed to fuel or not.

Apparently, the oxygen has to be more than 0.1% in order for the AEM to detect. Therefore, the oxides are an integral portion of the Galvanic Potential Source. FIG. 7 shows an AEM scan after the surface has been removed to an 18A depth on an intermetallic sample after 40 hours of refluxing with gasoline.

Regarding properties of the Galvanic couples, the galvanic couple with variable potential can serve as a redox catalyst where metals can be plated out on the surface of the couple. Further, with high value of electrode potential chloride can be oxidized to Cl. or $Cl_2$.

$$Cl^- \longrightarrow Cl\bullet + e^- \quad (-1.36\ V)$$

$$\text{and } Cl\bullet + Cl\bullet \longrightarrow Cl_2 \uparrow$$

Commercial grade gasoline does contain water and the water will have inorganic compounds dissolved in it. Some of the common cations in fuel are sodium, calcium and iron and often these metals can be plated out with intermetallics by reduction:

$$Na^+ + e^- = Na \quad (-2.71\ V)$$

$$Ca^{2+} + 2e^- = Ca \quad (-2.87\ V)$$

Many times the counter ions of calcium is phosphate (calcium phosphate can be colloidal particulate just as $Ca(OH)_2$)

$$Ca(OH)_2 + 2e^- = Ca + 2OH^- \quad (-3.02\ V)$$

For phosphate the advantage is that the phosphorous is a flame retardant due to the char formation during combustion:

$$H_3PO_4 + 2H^+ + 2e^- = H_3PO_3 + H_2O \quad (-0.28\ V)$$

$$H_3PO_4 + 3H^+ + 3e^- = P + 3H_2O \quad (-0.45\ V)$$

For Cl. species the role is to intercept the combustion free radical scheme in such a way that some positive benefit may be obtained. Most of the voltages can be balanced by Galvanic Potentials in Table 3.

Figure 10:
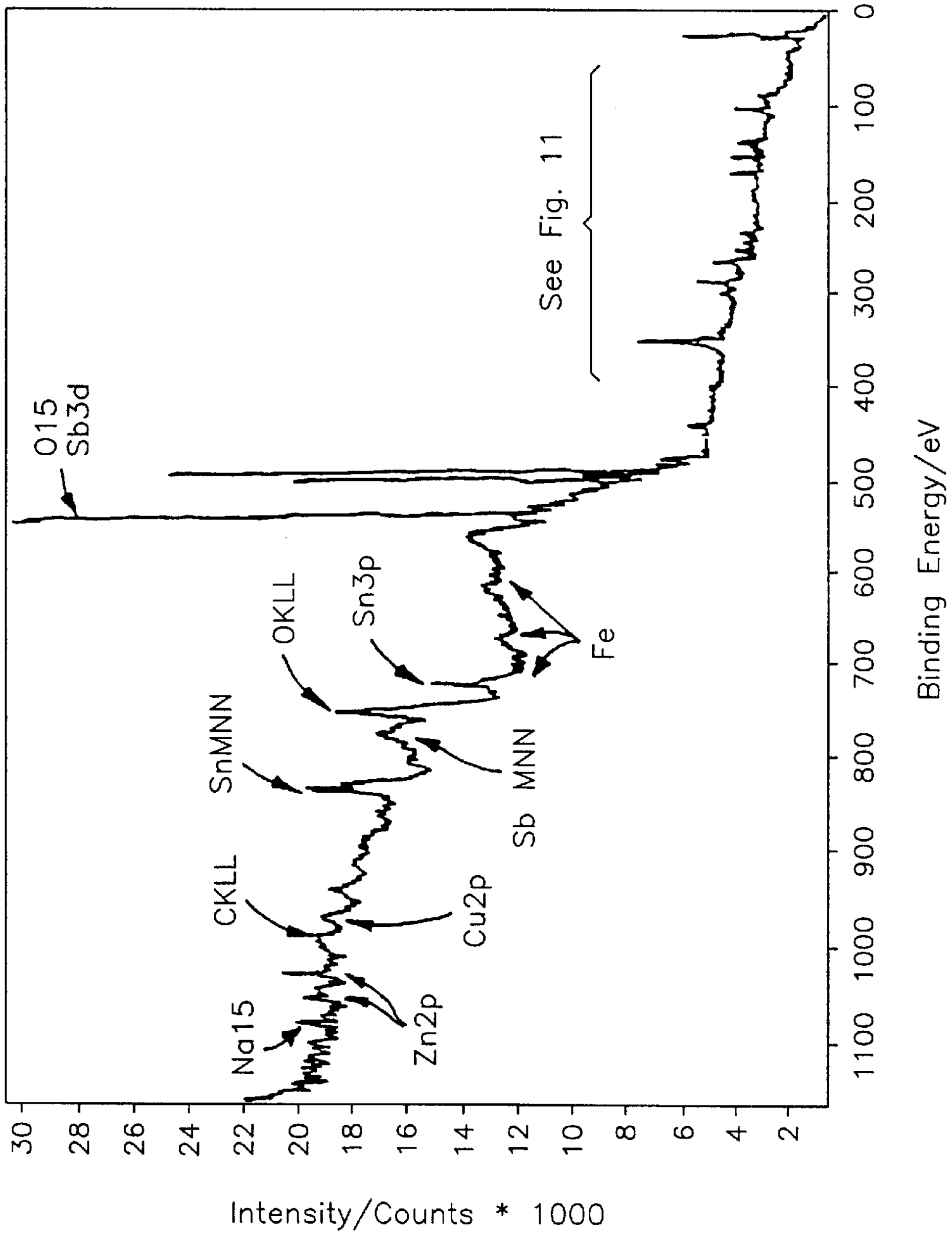
Figure 11:
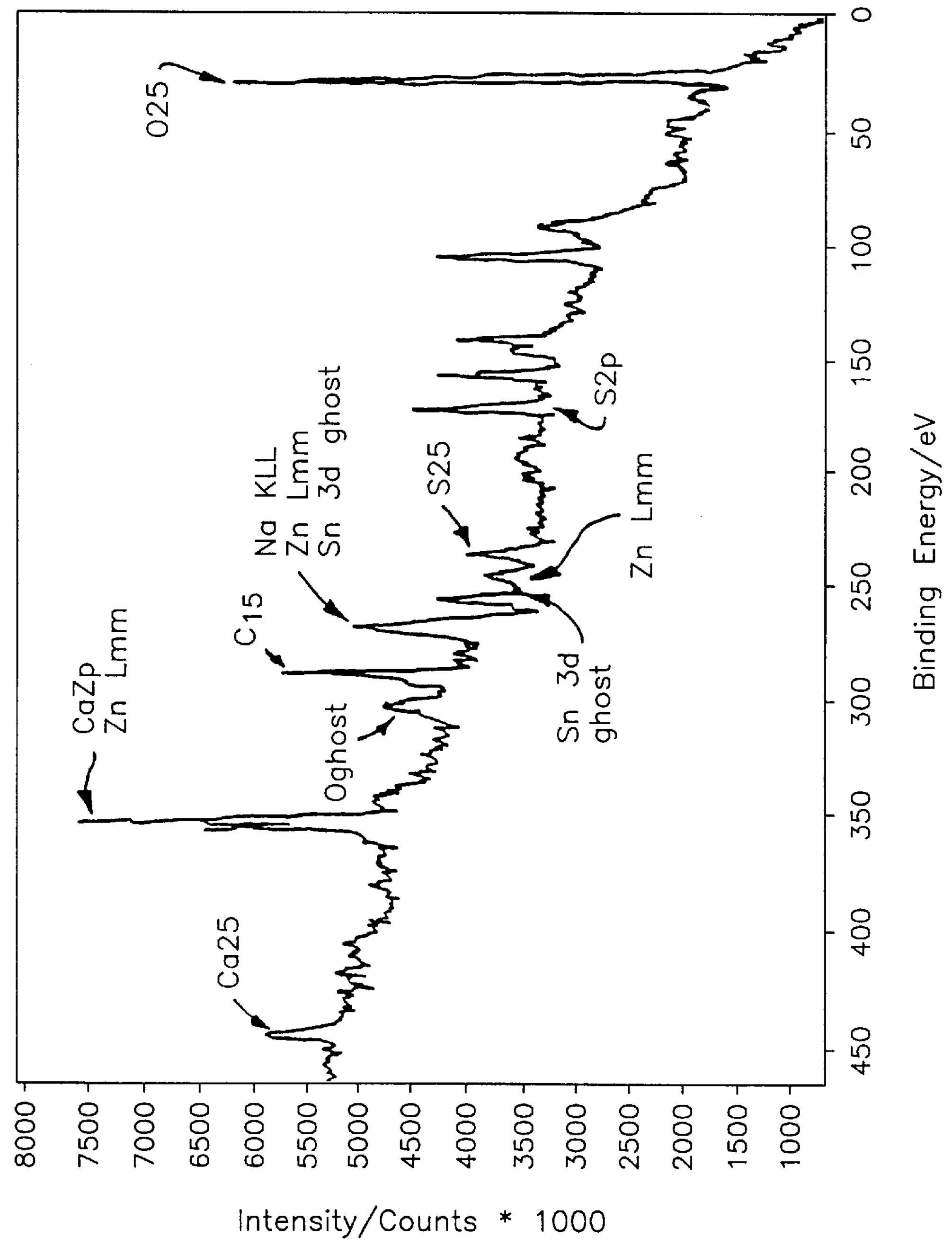

In another experiment, a commercial grade gasoline (Shell Unleaded 89) was burned and the digested residue after combustion was tested for chloride. A positive test was confined in quantity around 10 ppm, by Standard Method with silver nitrate solution. However, when gasoline was digested with nitric acid, the chloride test was negative due to the oxidation of $Cl^-$ to $Cl_2$. Experiments conducted when the intermetallics were exposed yielded calcium. There were also a number of cases in which sodium metal was also detected (see FIGS. 8 and 9). Referring to FIGS. 10 and 11, XPS results from a test with diesel fuel are shown. There is particularly high extraction of Ca, and O, Ca, Na, S, and Zn were also detected.

It will be appreciated from the above description that significant quantities of trace metals are removed from the fuel before combustion. As a result, a cleaner fuel is created that by it's nature generates an improved and dramatic change to the corrosive and combustion process within the fuel. An important point is the large surface area for contact of the filter with the fuel. This, of course, can be achieved in many different ways. The filter may take the form of a porous structure through which the fuel passes at any stage before combustion. It may, for example, be mounted in a fuel line at the retailer, at the wholesaler, or at any of the refining stages. For example, the filter may be incorporated into the distillation column of the refining process, or used at a later stage. The form may be a porous structure, a column coating, or it may be incorporated in a fluidised bed. Further, the filter may take the form of a saturated porous media forming spaced-apart flow vanes in a column.

Another way of achieving a high surface area contact is to provide very small particles of the intermetallic in a filtration bed or column. In this example, the particles may have a size at the microscopic level—produced by the gas atomisation of the process described above. In the example described, the particle size is approximately 10 $\mu$m however, the size may be in the range $1\times10^{-6}$ m to $1\times10^{-4}$ m. Such a filter can be used during or after refining for automotive, aircraft and aerospace, two-cycle engine, motorcycle and diesel engine fuel filtration. If particles are suspended in fuel, they should be removed at a later stage before combustion, such as by mechanical filtration. However, where fuel is pumped through one or more conduits in an environment in which a porous structure filter can be easily cleaned or replaced, such a form of filter may be preferable.

A suitable analogy for operation of the filter is filtration of water to remove undesirable constituents such as chlorine and nitrates, as described in U.S. Pat. No. 5,510,034 (Heskett, D. E.). These filters operate on a different principle which involves leaching of copper and zinc ions into solutions. However, this technology helps one to visualise the effect of the present invention—removal of small fuel constituents before combustion to achieve cleaner emissions.

The invention is not limited to the embodiments described, but may be varied within the scope of the claims in construction and detail.

What is claimed is:

1. A fuel filter comprising an intermetallic compound of metals in which the compound has a crystal structure at the atomic level which is different from that of any of said metals alone and said intermetallic compound comprises particles having an average diameter in the range of $1\times10^{-6}$ m to $1\times10^{-4}$ m.

2. A fuel filter as claimed in claim 1, wherein the metals comprise tin and antimony.

3. A fuel filter as claimed in claim 2, wherein the tin atomic composition is in the range of 39.5% to 57% by weight and the antimony composition is substantially the balance.

4. A fuel filter as claimed in claim 3, wherein the tin and antimony are substantially equiatomic.

5. A fuel filter as claimed in claim 1, wherein the filter has a porous structure.

6. A fuel filter as claimed in claim 5, wherein the porosity is in the range of 30% to 50%.

7. A fuel filter as claimed in claim 5, wherein the filter has a permeability of $1\times10^{-13}$ $m^2$ to $400\times10^{13}$ $m^2$.

8. A fuel filter as claimed in claim 1, wherein the filter intermetallic compound possesses a variable electrode potential from E°+0.290 V to +2.648 V when placed in an environment of fuel having trace moisture with a variable $H^+$ concentration.

9. A fuel filter as claimed in claim 1, wherein the filter further comprises an oxide on its surface.

10. A fuel filter comprising an intermetallic compound of tin and antimony, in which, the compound has a crystal structure at the atomic level which is different from that of the tin and antimony alone, the compound comprises an oxide on its surface, the tin atomic composition is in the range of 39.5% to 57% and the antimony composition is substantially the balance, and the compound is in the form of particles having an average diameter in the range of $1\times10^{-6}$ m to $1\times10^{-4}$ m.

11. A fuel filter as claimed in claim 10, wherein the filter has a porosity in the range of 30% to 50%.

12. A fuel filter as claimed in claim 11, wherein the filter has a permeability of $1\times10^{-13}$ $m^2$ to $400\times10^{-13}$ $m^2$.

13. A fuel filter as claimed in claim 10, wherein the tin and antimony are substantially equiatomic.

14. A fuel filter as claimed in claim 10, wherein the intermetallic compound possesses a variable electrode potential from E°+0.290 V to +2.648 V when placed in an environment of fuel having trace moisture with a variable $H^+$ concentration.

15. A process for producing a fuel filter, the process comprising the steps of:

preparing a melt of a formulation of tin and antimony in which the tin atomic composition is in the range of 39.5% to 57% and the atomic composition of the antimony is the balance, an inert atmosphere being provided around the melt; and forming the melt into droplets and rapidly solidifying the droplets to form particles having an average diameter in the range of $1\times10^{-6}$ m to $1\times10^{-4}$ m with an atomic crystal structure different from that of tin and antimony separately.

16. A process as claimed in claim 15, wherein the particles are bonded by sintering to form a porous filter structure.

17. A process as claimed in claim 16, wherein the sintering takes place at a temperature in the range of 300° C. to 425° C. for a time duration of 20 to 40 minutes.

18. A process as claimed in claim 16, wherein a pore forming agent is added prior to sintering.

19. A process as claimed in claim 15, wherein the melt formulation is substantially equiatomic.

20. A process as claimed in claim 15, wherein the solidification cooling rate is at least $10^{3\circ}$ C./s.

21. A method of filtering fuel comprising the steps of:

providing a filter comprising an intermetallic compound of metals in which the compound has a crystal structure at the atomic level which is different from that of the metals alone, and bringing the fuel into contact with the filter until an electrochemical displacement reaction occurs with the filter acting as a host for a galvanic reaction until trace metal ions in said fuel are deposited onto the filter.

22. A method as claimed in claim 21, wherein the fuel contains water.

23. A method of filtering a fuel having trace water, the method comprising the steps of:

providing a filter comprising an intermetallic compound of metals in which the compound has a crystal structure at the atomic level which is different from that of the metals alone, and has an oxide on its surface; and bringing the fuel having trace water into contact with the filter until an electrochemical displacement reaction occurs with the filter acting as a host for a galvanic reaction until trace metal ions in said fuel having trace water are deposited onto the filter.

* * * * *